Patented Nov. 8, 1949

2,487,309

UNITED STATES PATENT OFFICE 2,487,309

PROCESS OF MANUFACTURING A SYNTHETIC RESIN FROM RED OIL, A COAL-TAR DISTILLATE

Alfred Champagnat and Robert Willer, Paris, France, assignors to Societe Generale des Huiles de Petrole, Paris, France, a corporation of France No Drawing. Application January 4, 1946, Serial No. 639,150. In France January 19, 1945

1 Claim. (Cl. 260—57)

The distillation of coal tars which are produced in coking plants and gas works, that is to say high temperature tars, is usually effected down to a pitch residue having a melting point of 70 to 75° Kraemer-Sarnow.

The pitch thus produced is of a quality suitable for the agglomeration of coal and the heaviest distillate is anthracene oil.

The applicants have already effected industrially the distillation of high temperature tar down to a much harder pitch defined by a softening point of 140° Kraemer-Sarnow. This distillation was effected in vacuo and with an injunction of superheated steam, but it could also be carried out with an injection of superheated steam, at atmospheric pressure.

The product which distills between the temperature corresponding to the residue melting at 75° C. and the final residue melting at 140° C., both said temperatures being measured according to the Kraemer-Sarnow method, that is to say the distillate obtained beyond anthracene oil, is a resinous product which has been given the name of red-oil.

The foregoing is known and has only been explained herein for the purpose of defining the product called "red oil." It is also known that this red oil, which contains practically no free carbon, has excellent insulating properties from an electrical point of view.

It has been found that red oil resinifies more or less readily with a solution of formaldehyde in the presence of acid or alkaline catalysts. Such resinification should preferably be effected in a solvent such as benzol, since red oil is too viscous at the temperature of 90 to 100° C. at which resinification is produced. It is also possible to treat red oil with trioxymethylene without dissolving it in a solvent.

A glossy black material is thus obtained, which is brittle when cold and melts in the hot state, and which it has hitherto not been possible to use such as it is for the manufacture of plastic materials.

On the other hand, if, according to the present invention the poly-condensation of a mixture of red oil and phenol with a solution of formaldehyde is effected in the presence of appropriate acid or alkaline catalysts, a synthetic resin is readily obtained which is similar to the classical synthetic resins of the phenoplast type and which is suitable for being used for the same purposes.

The polycondensation is advantageously carried out in a sufficiently moderate manner for the resin to be still plastic at temperatures round about 100° C. and for it to be possible to press it, at high temperatures and pressures, after the addition of fillers such as sawdust and of hardening agents like hexamethylenetetramine, into the state of strong, insoluble and infusible pressed masses which have a good superficial gloss and are electrically insulating. It is also possible to carry out the polycondensation reaction in such a manner as to obtain a resin which is more specially adapted to the manufacture of stratified materials, materials formed by sheets of paper or of fabric saturated with synthetic resin and pressed or calendered in the hot state. By an appropriate choice of the catalysts and of the reaction conditions, it is also possible to prepare resins intended for the manufacture of plywoods, for the impregnation of wood in order to improve its properties, for the manufacture of abrasive wheels, for the manufacture of varnishes for all purposes and in particular for protection against corrosion.

The examples given hereinafter will show the variety of the conditions of preparation of the synthetic resin which is the object of the invention, according to the uses for which it is intended.

*Example 1.*—100 grammes of red oil and 100 grammes of phenol are melted together and 100 cc. of a 40% solution of formaldehyde are added thereto together with 1.2 cc. of concentrated sulphuric acid. The mixture is stirred for about five hours at 95° C. The aqueous medium is then neutralised by a suitable addition of sodium carbonate. The resin thus obtained is washed with water still between 90 and 100° C. until the washing water no longer contains any dissolved salts. The resin is then dried in vacuo at a temperature not exceeding 100° C.

100 parts of the resin thus obtained are crushed and are intimately mixed with 100 parts of sawdust and 10 parts of hexamethylenetetramine. One part of lime which acts as a hardening accelerator is added to the mixture and one part of stearic acid which acts as a lubricant.

The plastic powder thus obtained, when pressed in known manner at a temperature between 160 and 200° C. and a pressure of 150 to 200 atmospheres gives very strong, insoluble and infusible products with a beautiful polished surface.

*Example 2.*—2 kg. of red oil and 2 kg. of phenol are melted together. The mixture is stirred at 95° C. and 90 grammes of hydrochloric acid at 22° Baumé are added thereto, and then 3 kg. of a 30% solution of formaldehyde. Stirring is continued for 4 hours, the temperature being maintained by reflux boiling.

The aqueous phase is separated by decantation, then the temperature is raised to 140° C. and kept there for 40 minutes. The drying of the resin is completed in vacuo for 10 minutes.

A resin is obtained which has a melting point of 100° This resin is suitable for the preparation of plastic powder in the following manner:

To 1 kg. of crushed resin, are added 70 grammes of hexamethylenetetramine, 10 grammes of lime, 20 grammes of aluminum stearate, 1 kg. of sawdust and the appropriate dyes or pigments. The mixture is hot rolled, as is the practice for the manufacture of plastic powders mainly consisting of phenolformol resin, and then crushed.

The plastic powder obtained, if pressed in known manner at between 150 and 200° C. and at a pressure of 150 to 200 atmospheres, gives products possessing mechanical, electrical and chemical properties which are comparable with those of the products prepared with the classical phenoplast powders.

*Example 3.*—1 kg. of red oil is melted with 1 kg. of phenol. To the mixture which is heated to 95° C. and mechanically stirred, are added 400 cc. of a 25% ammonia solution, then 2 kg. of a 30% formaldehyde solution.

Stirring is continued for two hours, while reflux boiling is maintained. The aqueous phase is then decanted and 60 cc. of soda lye at 36° Baumé are added to the separated soft resin. Stirring is continued for 30 minutes at 95° C. while drying in vacuo.

The resin thus obtained, which has a melting point of 60°, is soluble in a mixture of equal parts of ethyl alcohol and benzol.

This resin, such as it is or in the form of a solution of between 30 and 60% concentration according to the viscosity required, can be used for the manufacture of stratified materials, the impregnation of wood, the manufacture of plywoods, the manufacture of abrasive wheels, and in certain cases as a protective coating, with a suitable plasticizer. The methods of using the resin for these applications are similar to those used for phenoplast resins.

The above examples are not limitative. It is possible, in fact, to adopt a ratio for the quantities of red oil and of phenol which is different from 1:1. If the amount of phenol relatively to that of red oil is decreased, a resin is obtained which is more flexible but which is slower in hardening, a quality which is sought after for certain applications.

It is possible to use, instead of phenol, other substances with a phenol function which are capable of reacting, such as metacresol, the xylenols, and so forth.

The formaldehyde in solution can, of course, be replaced by trioxymethylene and it is also possible to use other aldehydes.

The reaction can also be carried out with another acid or alkaline catalyst than those hereinbefore specified, as is known for the manufacture of phenol-formol resins. All classical catalysts or hardening accelerators can be used for the transformation of fusible and soluble resin into infusible and insoluble resin. In short, the methods of preparation of the red oil-phenol-formol resins can be as varied as the methods of preparation of the known phenol-formol resins, the invention being characterised by the use of red oil with phenol or its equivalents, a fact which enables a substantial economy of phenol to be effected and produces products having advantageous properties.

Red oil which is rather a red resin, looks like sealing wax. Its Engler viscosity at 100° is from 5 to 10°. It solidifies between 50 and 80°.

The invention has also for its object the new industrial products formed by both the synthetic resins and the plastic powders obtained by the operation of the process hereinbefore explained.

We claim:

A process for the preparation of synthetic resins similar to phenol-formaldehyde resins, comprising condensing the solid coal tar distillate "red oil" which distills between the temperature corresponding to the residue melting at 75° C. and the final residue melting at 140° C., both said temperatures being measured according to the Kraemer-Sarnow method with a phenol of the group consisting of phenol, metacresol and xylenols, and with formaldehyde in the presence of a polymerization catalyst at a temperature of 95° C.

ALFRED CHAMPAGNAT.
ROBERT WILLER.

REFERENCES CITED

The following references are of record in the file of this patent:

UNITED STATES PATENTS

| Number | Name | Date |
|--------|------|------|
| 1,252,507 | Tarasoff et al. | Jan. 18, 1918 |